United States Patent [19]
Becker et al.

[11] 4,429,338
[45] Jan. 31, 1984

[54] EARTH CONTACT MONITORING DEVICE FOR A POLYPHASE THREE-PHASE FILTER CIRCUIT

[75] Inventors: Michael Becker, Uttenreuth; Alfons Fendt, Erlangen; Dusan Povh, Nuremberg; Klaus Renz, Fürth; Gerhard Schuch, Erlangen; Hermann Waldmann, Weiher, all of Fed. Rep. of Germany

[73] Assignee: Siemens Aktiengesellschaft, Munich, Fed. Rep. of Germany

[21] Appl. No.: 395,187

[22] Filed: Jul. 6, 1982

Related U.S. Application Data
[63] Continuation of Ser. No. 164,571, Jun. 30, 1980, abandoned.

[30] Foreign Application Priority Data
Jul. 11, 1979 [DE] Fed. Rep. of Germany ....... 2928024

[51] Int. Cl.³ ............................................. H02H 3/16
[52] U.S. Cl. ......................................... 361/42; 361/47; 361/113
[58] Field of Search ....................... 361/42, 46, 47, 48, 361/49, 50, 113; 340/650, 651

[56] References Cited
U.S. PATENT DOCUMENTS

| | | | |
|---|---|---|---|
| 1,539,834 | 6/1925 | Gaarz | 361/48 |
| 1,988,121 | 1/1935 | Hillebrand | 361/47 |
| 2,535,064 | 12/1950 | Harrison | 361/48 |
| 3,286,129 | 11/1966 | Gagniere | 361/47 |
| 3,515,943 | 6/1970 | Warrington | 361/113 |
| 4,099,215 | 7/1978 | Parrier et al. | 361/42 |

*Primary Examiner*—Patrick R. Salce
*Attorney, Agent, or Firm*—Kenyon & Kenyon

[57] ABSTRACT

A monitoring system for detecting earth contact of at least one phase of a polyphase network. Each of the phases in the network is connected by a capacitive-inductive filter to a neutral node which is connected to earth. In one embodiment of the invention, the current flowing from the neutral node to earth is detected by an induction current transformer which provides a signal responsive to said earth current. The output signal of the induction current transformer is conducted through at least one low pass filter for suppressing harmonics, and rectified to produce a direct current voltage signal, the amplitude of which is proportional to the amplitude of the fundamental frequency component of said signal. A fault indicating signal is produced when the direct voltage signal exceeds a predetermined value.

5 Claims, 1 Drawing Figure

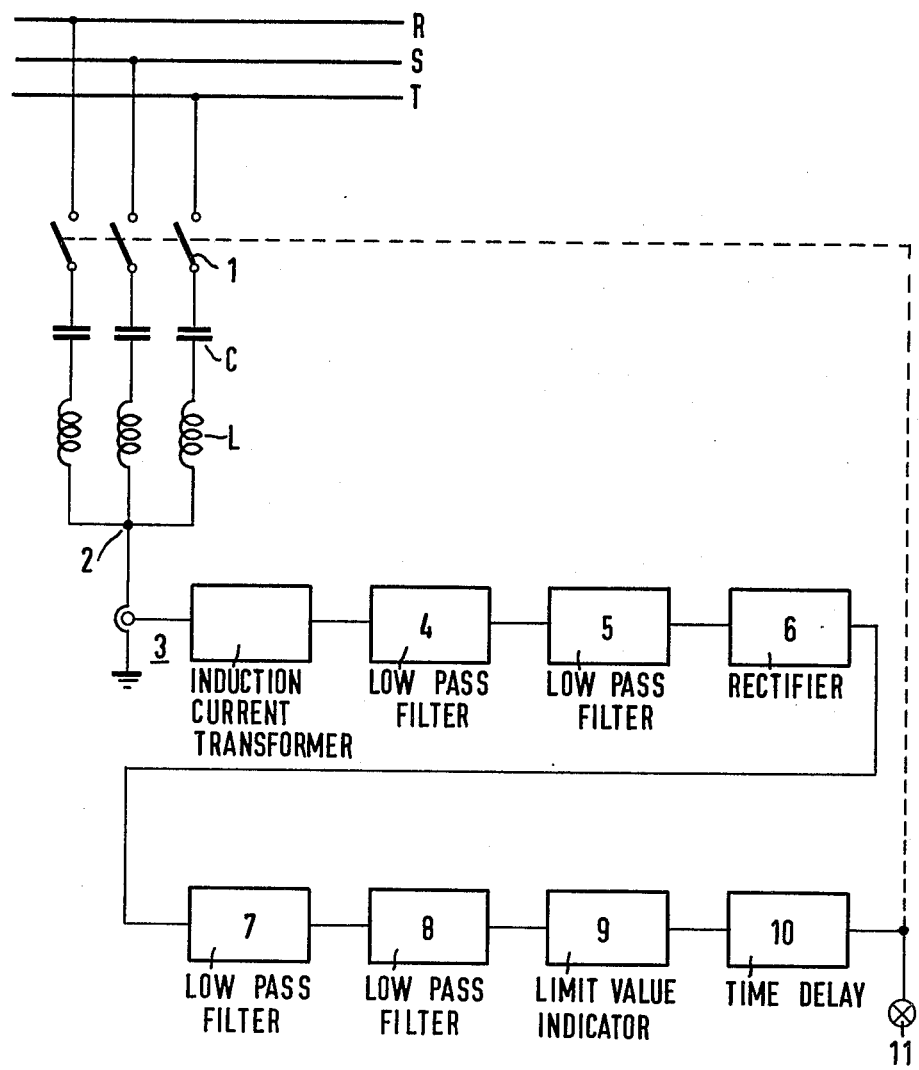

EARTH CONTACT MONITORING DEVICE FOR A POLYPHASE THREE-PHASE FILTER CIRCUIT

This is a continuation of application Ser. No. 164,571, filed June 30, 1980, now abandoned.

BACKGROUND OF THE INVENTION

This invention relates to earth contact monitoring devices for polyphase networks, and more specifically to devices which provide an indication when one or more of the phases in a polyphase network are in electrical contact with the earth.

Known methods and devices for monitoring earth contact of polyphase electrical networks have required that the network be energized with auxiliary potential having determined frequency and wave shape. Generally, the characteristics of the auxiliary voltages are monitored and evaluated to determine whether any of the phases has made contact with the earth. Although existing earth contact monitoring systems such as those described in German references DE-OS No. 24 58 530, and DE-AS No. 25 45 315 have accurately detected earth contact by one or more of the conductors in a polyphase system, the required specific auxiliary voltages must be produced by separate signal generators which produce signals of predetermined characteristics. Thus, the use of auxiliary signal generators increases the cost and complexity of the earth contact monitoring system. In addition, the complexity of such systems renders them susceptible to failure.

Accordingly, it is an object of this invention to provide an earth contact monitoring device for a polyphase electrical network which is inexpensive and simple to use.

It is a further object of this invention to provide an earth contact monitoring device which does not require auxiliary voltages or signal generators.

SUMMARY OF THE INVENTION

The foregoing and other problems are alleviated by this invention which measures the current flowing to earth from a neutral connection of a polyphase filter circuit. Circuitry is provided to suppress characteristic harmonics in the earth current so as to substantially isolate the line-frequency fundamental oscillation of the earth current. Further circuitry converts the fundamental oscillation of the earth current into a direct current voltage signal which is proportional to the amplitude of such oscillations. The direct current voltage signal is monitored and compared with a predetermined limit value.

Each of the phase conductors in the polyphase network is connected to a neutral node by means of a respectively associated filter circuit having phase windings which are generally tuned to the frequency of characteristic harmonics. In one embodiment of the invention wherein each filter circuit is formed by the series combination of a capacitor and an inductor, the tuned filter circuit behaves as a capacitive impedance at the frequency of the fundamental oscillation. Assuming that the various phases in the polyphase network are similarly loaded, such as in a symmetrically loaded three-phase network, the fundamental frequency currents flowing through the respective filter circuits will substantially cancel one another at the neutral node.

In the event that one phase of the polyphase network contacts earth, almost no current in the fundamental frequency at that particular phase will be available to flow through the respective filter circuit to the neutral node. The absence of such a current will cause the amplitude of the uncancelled fundamental frequency currents flowing from the neutral node to earth to increase in amplitude. Such an increase in amplitude will be considerably greater than any increase which is caused by a fault in a filter circuit, illustratively, the failure of a subcapacitor in a phase capacitor in the filter circuit. The increase in the amplitude of the fundamental frequency current flowing from the neutral node to earth is detected by a limit value indicator. The limit value indicator produces a responsive output signal which is conducted, in one embodiment of the invention, to a time delay circuit which is intended to prevent false fault indications resulting from network transients. If the limit value indicator maintains its fault output signal for a period longer than the predetermined time delay of the time delay circuit, a fault indicator will be energized.

BRIEF DESCRIPTION OF THE FIGURE

Comprehension of the invention will be facilitated by reading the following detailed description in conjunction with the FIGURE which shows an embodiment of the invention in combined block and line, and schematic representation.

DETAILED DESCRIPTION

In one embodiment of the invention, each of three conductors RST in a three-phase network is connected by a respectively associated switch 1 to a respective filter circuit consisting of the series connection of a capacitor C with an inductance coil L. In practice, each capacitor may be constructed of a plurality of series-connected capacitors. The outputs of the respective filter circuits are connected at neutral node 2 which is connected to earth.

A voltage isolating inductive current transformer 3 is disposed so as to detect the current flowing from neutral node 2 to earth. The output of current transformer 3 is conducted through first order low pass filters 4 and 5 which are connected in series and tuned to the line frequency of the three-phase network. Illustratively, the smoothing time constant of filters 4 and 5 may be 2 milliseconds in three-phase networks which operate at 50 hertz. The series connection of the two low pass filters advantageously suppresses the harmonics in the output of current transformer 3, while only negligibly reducing the amplitude of the fundamental frequency component. Thus, the signal at the output of low pass filter 5 corresponds only to the fundamental frequency component of the earth current flowing from neutral node 2.

The output voltage signal of low pass filter 5 is conducted to a threshold-free rectifier circuit 6. The direct current output of rectifier circuit 6 is conducted to the series combination of two additional first-order low pass filters 7 and 8. In one embodiment of the invention in which the three-phase network operates at 50 hertz, the smoothing time constant of low pass filters 7 and 8 may be 12–15 milliseconds. Thus, the output of low pass filter 8 produces a direct current voltage signal, the amplitude of which is proportional to the fundamental frequency component of the earth current. The proportional direct current voltage signal is conducted to a limit value indicator 9, which, in one embodiment of the invention, may be calibrated to produce an output signal when the earth current exceeds 10–30 percent of the nominal current in one phase of the filter circuit. The output signal of limit value indicator 9 is conducted to a time delay circuit 10, the delay response of which has been predetermined to avoid false fault indications caused by transient conditions and switching operations. If the output signal of time value indicator 9 remains in a fault state for a time period in excess of the preset delay response of time delay circuit 10, indicating device 11 will be energized. As indicated by the dashed line connected to the output of time delay circuit 10, additional circuitry may be provided for opening switches 1, and thereby isolating the filter circuits from the three-phase network RST.

Although the invention has been described in terms of specific embodiments and applications, it should be understood that persons of skill in the art can make modifications to the disclosure without departing from the spirit and scope of the invention.

What is claimed is:

1. A monitoring system for determining earth contact for at least one phase of a polyphase transmission network, the monitoring system further comprising:

a plurality of filter means for connecting respectively associated ones of the phases in the polyphase transmission network to a neutral node which is connected to earth via a direct connection, means for producing a first signal responsive to current flowing through said direct connection between said neutral node and earth, means for producing a second signal indicative of the amplitude of the fundamental frequency component of said first signal, means for producing a direct current voltage signal responsive to the amplitude of said second signal, and comparison means for producing a fault indicator signal when the amplitude of said direct current voltage signal exceeds a predetermined level.

2. The system of claim 1 wherein the means for producing said first signal is an inductive current transformer, and the means for producing said second signal is at least a first low pass filter.

3. The system of claim 1 wherein the means for producing said direct current voltage signal comprises at least one rectifier.

4. The system of claim 3 wherein there is further provided at least a second low pass filter connected to said rectifier.

5. The system of claim 1 wherein there is further provided a time delay circuit having a predetermined delay response connected to said comparison means.

* * * * *